Figure 1:
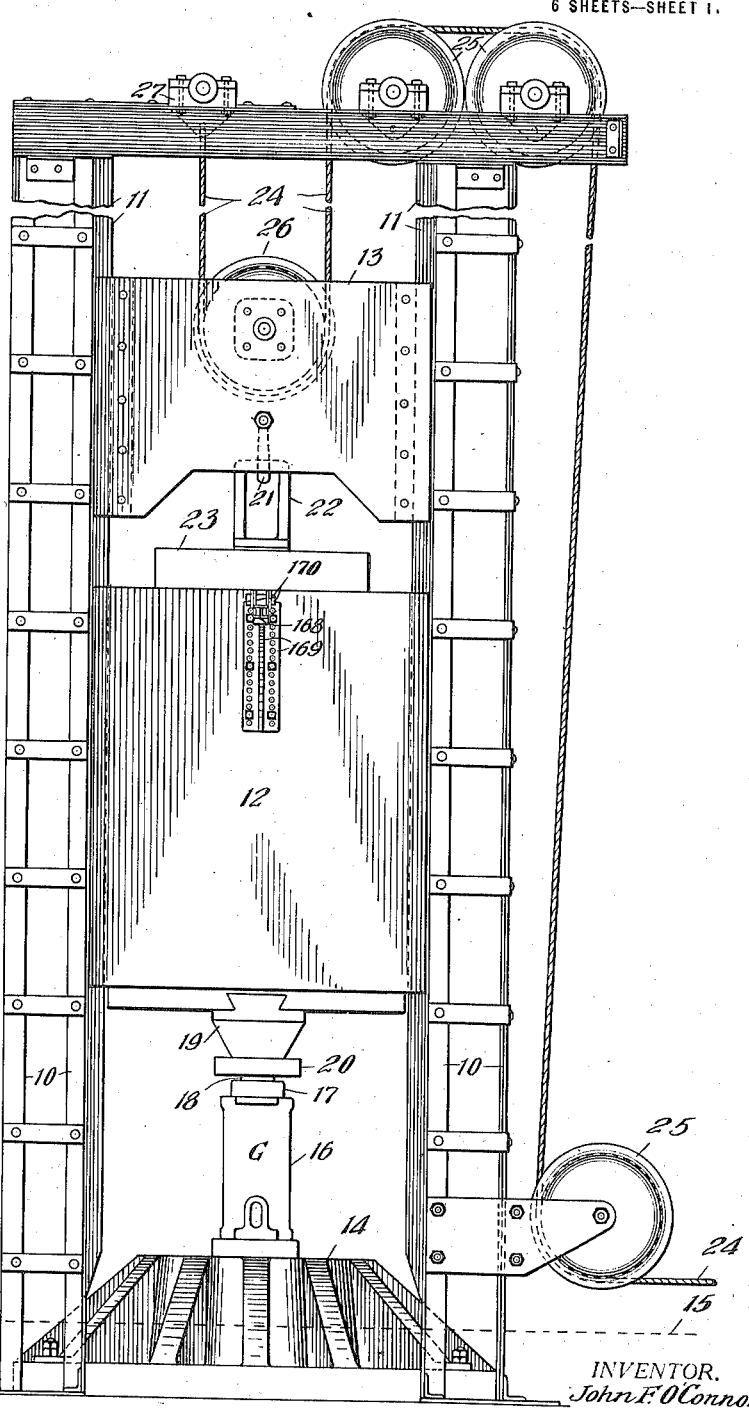

J. F. O'CONNOR.
MEANS FOR RECORDING ACTIONS OF RAILWAY DRAFT GEARS.
APPLICATION FILED JAN. 27, 1917.

1,290,310.

Patented Jan. 7, 1919.

6 SHEETS—SHEET 1.

WITNESSES:
Wm. Geiger

INVENTOR.
John F. O'Connor
BY George I. Haight
ATTORNEY

J. F. O'CONNOR.
MEANS FOR RECORDING ACTIONS OF RAILWAY DRAFT GEARS.
APPLICATION FILED JAN. 27, 1917.
1,290,310.
Patented Jan. 7, 1919.
6 SHEETS—SHEET 2.
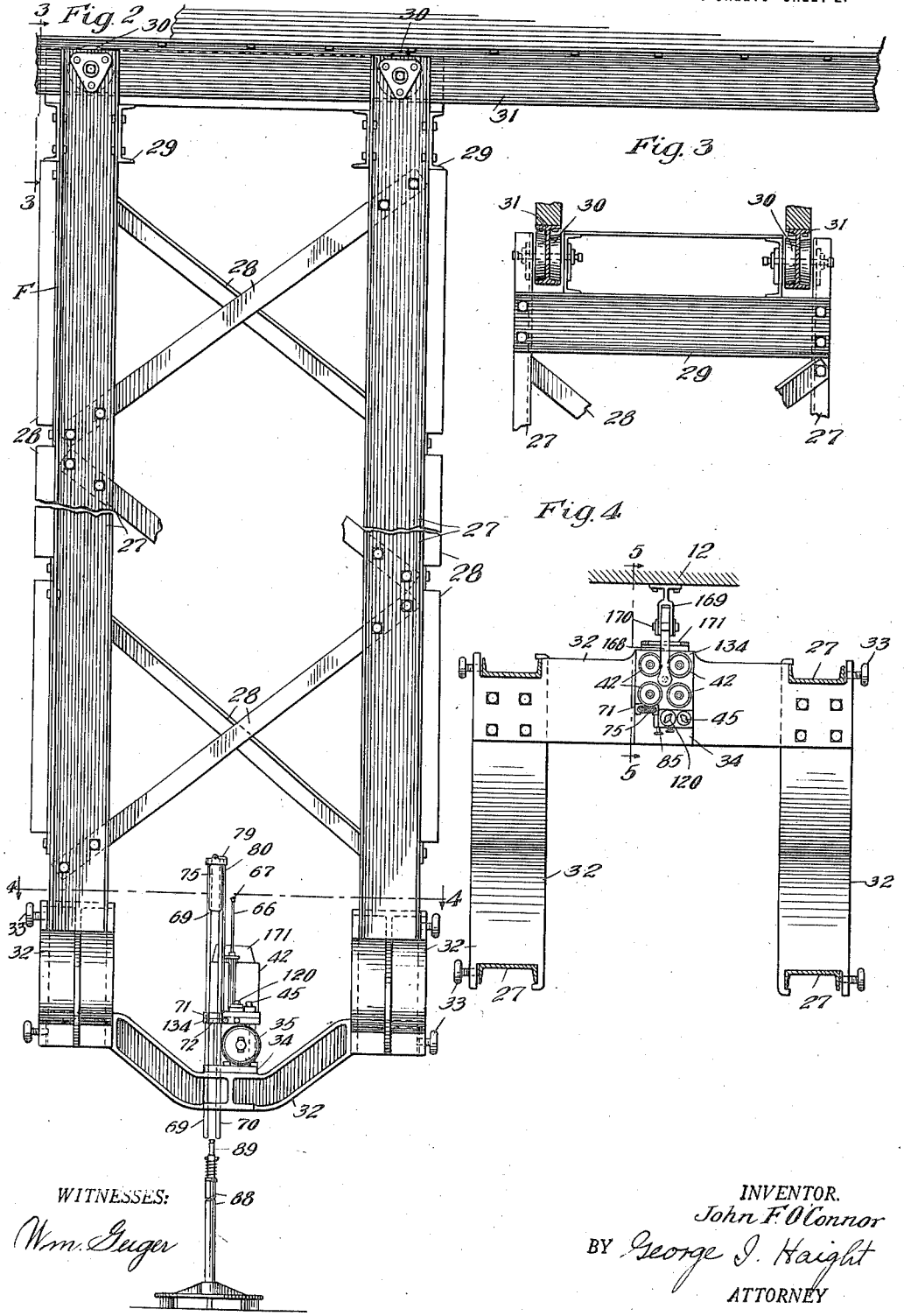
WITNESSES:
Wm. Geiger
INVENTOR.
John F. O'Connor
BY George J. Haight
ATTORNEY

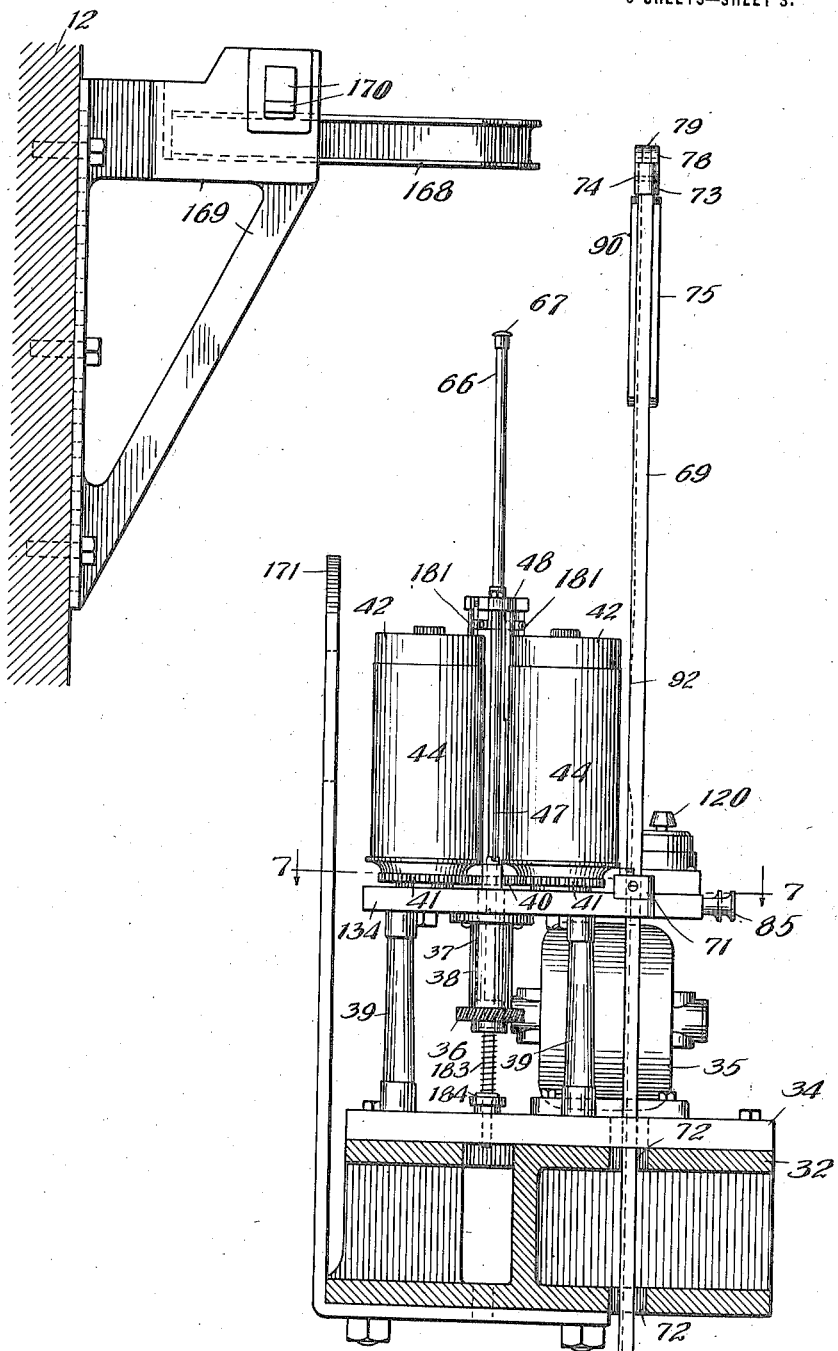

J. F. O'CONNOR.
MEANS FOR RECORDING ACTIONS OF RAILWAY DRAFT GEARS.
APPLICATION FILED JAN. 27, 1917.

1,290,310.

Patented Jan. 7, 1919.

6 SHEETS—SHEET 4.

WITNESSES:
Wm. Geiger

INVENTOR.
John F. O'Connor
BY George J. Haight
ATTORNEY

J. F. O'CONNOR.
MEANS FOR RECORDING ACTIONS OF RAILWAY DRAFT GEARS.
APPLICATION FILED JAN. 27, 1917.
1,290,310.
Patented Jan. 7, 1919.
6 SHEETS—SHEET 5.
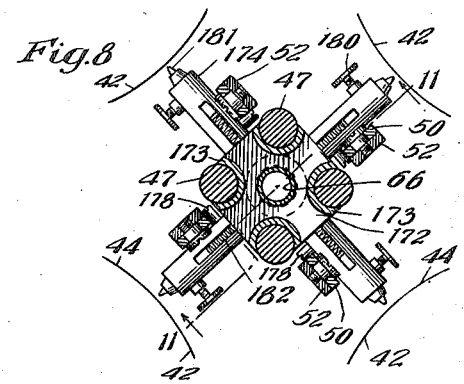
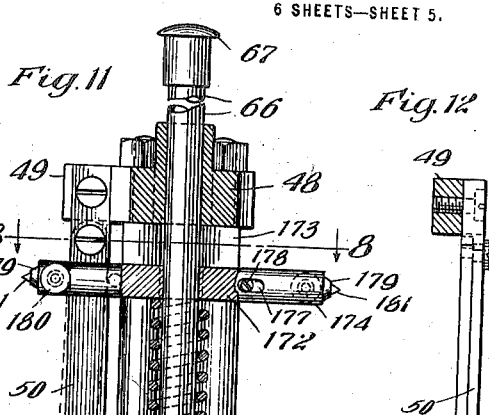
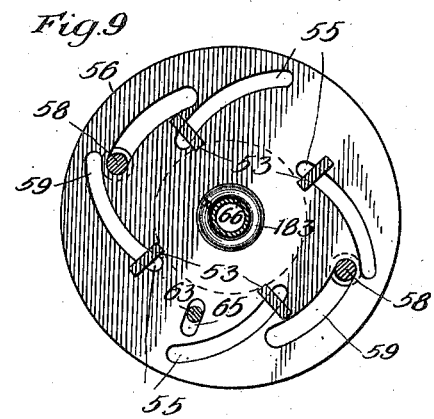
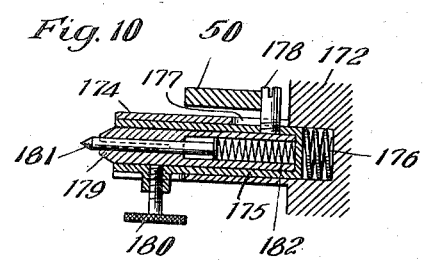
WITNESSES:
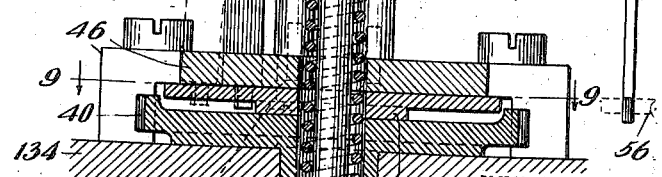
INVENTOR.
John F. O'Connor
BY George J. Haight
ATTORNEY J. F. O'CONNOR.
MEANS FOR RECORDING ACTIONS OF RAILWAY DRAFT GEARS.
APPLICATION FILED JAN. 27, 1917.
1,290,310.
Patented Jan. 7, 1919.
6 SHEETS—SHEET 6.
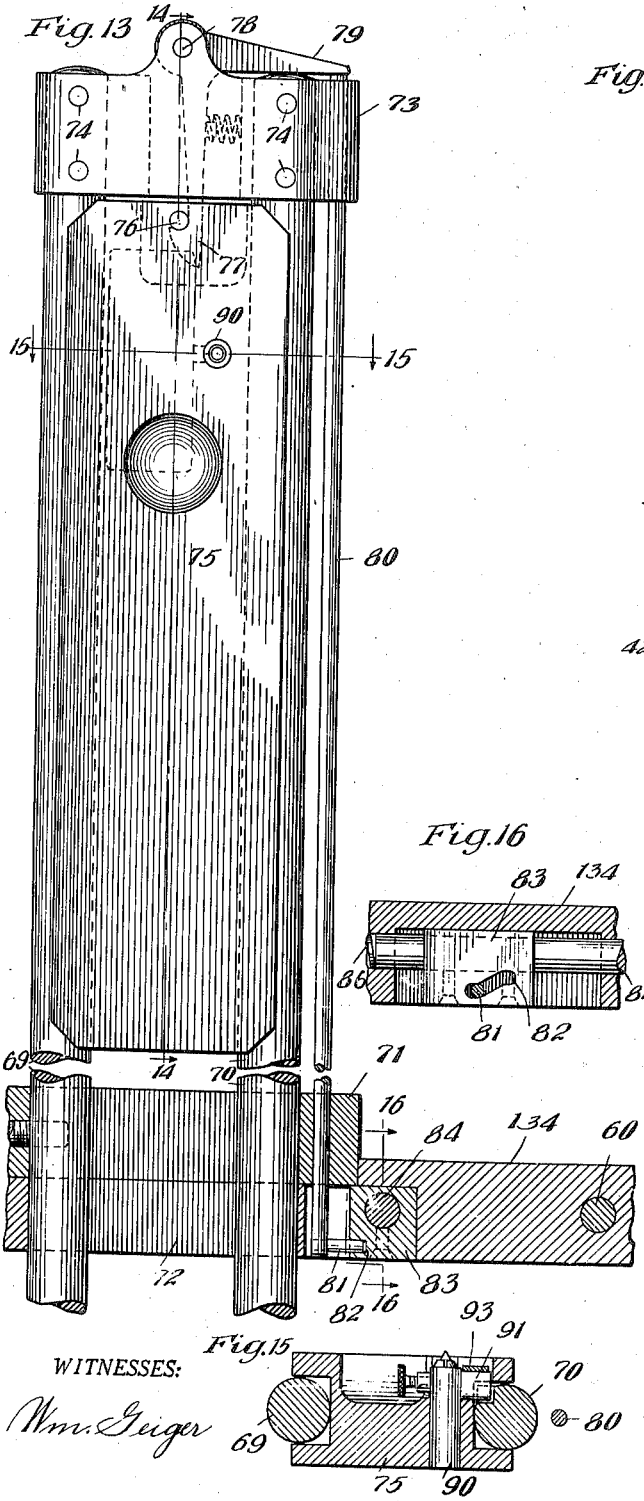
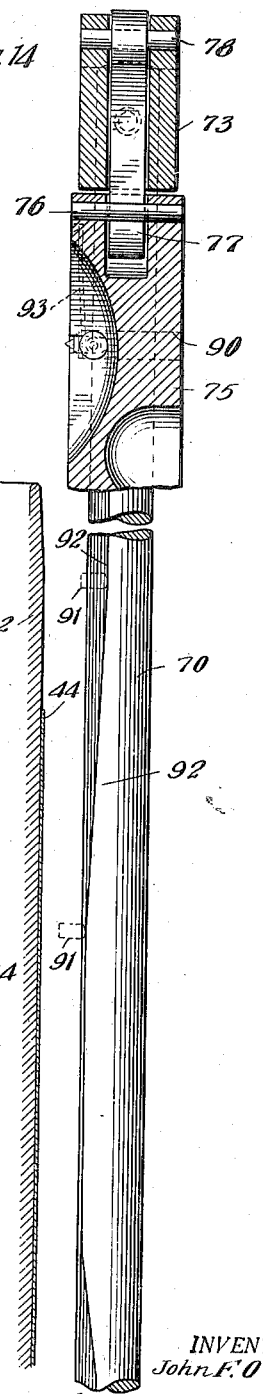
WITNESSES:
INVENTOR.
John F. O'Connor
BY George J. Haight.
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

MEANS FOR RECORDING ACTIONS OF RAILWAY DRAFT-GEARS.

1,290,310.           Specification of Letters Patent.           Patented Jan. 7, 1919.

Application filed January 27, 1917. Serial No. 144,813.

*To all whom it may concern:*

Be it known that I, JOHN F. O'CONNOR, a citizen of the United States, residing at Chicago, in the county of Cook and State of Illinois, have invented a certain new and useful Improvement in Means for Recording Actions of Railway Draft-Gears, of which the following is a full, clear, concise, and exact description, reference being had to the accompanying drawings, forming a part of this specification.

This invention relates to improvements in means for recording actions of railway draft gears.

In my Patent No. 1,217,984, for improvement in means for recording actions of railway draft gears, I have set forth in detail the desirability of obtaining accurate records of draft gears during their operation, particularly the desirability of obtaining records showing the deceleration and work performed by such gears at any instant during their operation. The present invention is an improvement on the structure disclosed in said Patent No. 1,217,984 and the improvement consists, broadly stated, in so arranging the recording mechanism as to obtain a plurality of identical records which are made simultaneously so that, when the tests of the draft gears are being witnessed by a number of people, each may receive an original record, all of the records being identical.

For a more detailed description of the records produced by a recording mechanism and the manner of reading the records, reference may be had to said Patent No. 1,217,984, and another Patent No. 1,225,996, granted May 15, 1917, for improvements in indicators.

Figure 6:
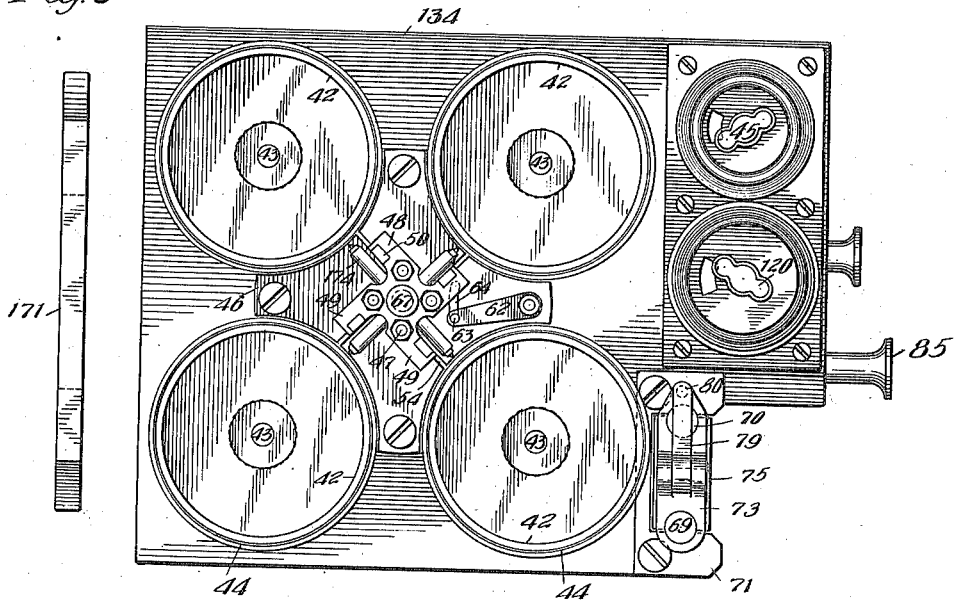
Figure 7:
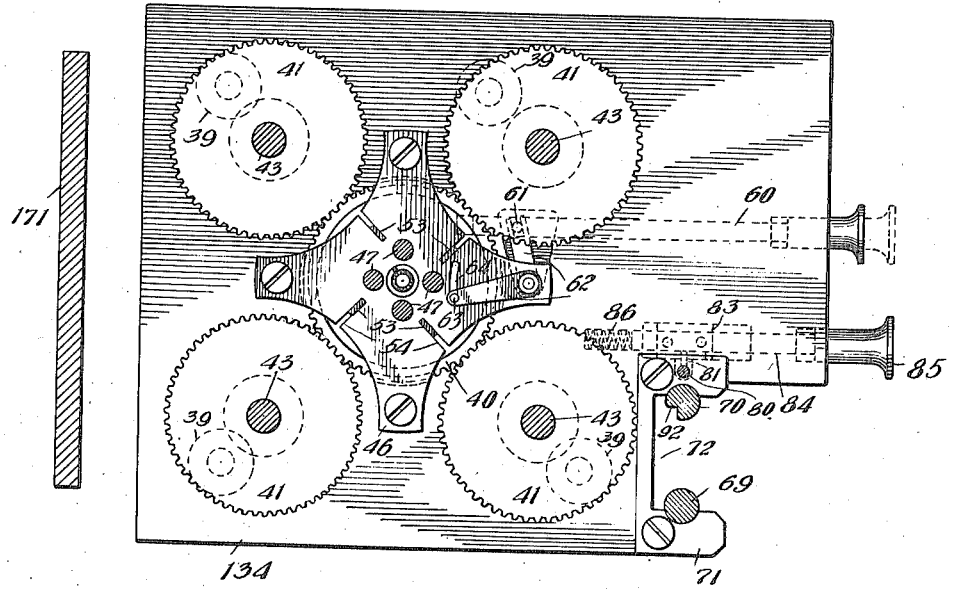

In the drawings forming a part of this specification Figure 1 is a front elevation of a drop hammer such as is employed in the testing of draft gears, a draft gear being shown in position and some of the elements being shown which are attached to the hammer or weight that are employed in conjunction with my improvements. Fig. 2 is a front elevation of the movable frame on which my improved recording mechanism is supported. Fig. 3 is a transverse vertical section of the structure illustrated in Fig. 2 and taken substantially on the line 3—3 thereof. Fig. 4 is a horizontal sectional view taken substantially on the line 4—4 of Fig. 2. Fig. 5 is an enlarged detail vertical sectional view taken substantially on the line 5—5 of Fig. 4. Fig. 6 is a top plan view of the recording mechanism proper, as illustrated in Fig. 5. Fig. 7 is a horizontal sectional view of the recording mechanism proper taken substantially on the lines 7—7 of Fig. 5. Fig. 8 is an enlarged horizontal sectional view, illustrating more particularly the pencil arrangement, and taken on the line 8—8 of Fig. 11. Fig. 9 is another horizontal view similar to Fig. 8, but taken on the line 9—9 of Fig. 11. Fig. 10 is a detail sectional view upon an enlarged scale illustrating one of the pencil holders. Fig. 11 is a vertical sectional view taken substantially on the line 11—11 of Fig. 8. Fig. 12 is an elevational view of one of the cam rods that control the pencil. Fig. 13 is an elevational view of the timing weight with its releasing mechanism, parts being broken away in order to prevent crowding of the drawing. Fig. 14 is a vertical sectional view taken substantially on the line 14—14 of Fig. 13, two positions of the pencil operating device on the cam being indicated in dotted lines therein. Fig. 15 is a horizontal sectional view taken substantially on line 15—15 of Fig. 13, and Fig. 16 is a vertical sectional view illustrating more particularly the cam for operating the trip rod, and taken substantially on line 16—16 of Fig. 13.

Referring more particularly to Fig. 1 illustrating the drop hammer, 10—10 denote vertical posts of any suitable rigid construction which are provided on their inner faces with guides 11—11 for the heavy weight or hammer 12 and lifting head 13. The bed plate or base is shown at 14, the same being preferably partly embedded in concrete, the floor line of which is indicated by the dotted line 15. In said figure, G represents a friction gear of a well known type, the same comprising a shell 16 resting upon the bed plate 14, friction shoes 17 and wedge 18, it being understood that a spring or springs are contained within the cylinder 16 to resist the movement of the shoes and wedge. For a detail description of a friction gear illustrative of the type shown in the drawing, reference may be had to my prior Patent No. 1,065,070, issued June 17, 1913.

To the under side of the weight 12 is secured a hardened block 19 which receives the wear when the blows are struck on the gear, a plate or follower 20 preferably being placed on the top of the gear to receive the blow from the falling weight. Connected with the member 13 by means of links 21 and 22 is an electromagnet 23 by which the hammer or weight 12 is adapted to be lifted. For raising the member 13, magnet 23 and weight 12, a motor (not shown) is provided having a winding drum about which winds the cable 24, the latter passing over idler pulleys 25—25 and pulley 26 rotatably mounted on the member 13, the end of the cable being suitably secured to the upper part of the frame work 27.

In operation, the member 13 is lowered with its magnet 23 until the latter engages the top of the weight 12. Thereupon, the magnet 23 is energized and the motor operated to wind up the cable 24, thus lifting the member 13, magnet 23 and weight 12. The weight is raised above the top face of the plate 20 to the desired height, depending upon the blow desired to be struck. At the desired time, the current to the electromagnet 23 is cut off thereupon releasing the weight 12 and permitting it to fall under the influence of gravity. The weight in pounds of the hammer 12 being known and the height from which it is permitted to fall, the blow in foot pounds which is struck on the gear may be easily calculated, as will be understood.

It is quite essential in recording or registering the action of the gears under the heavy blows which are struck, to prevent vibration or jarring of the recording mechanism. For this reason I mount the recording mechanism proper, hereinafter described, on a depending built-up framework F which consists preferably of four channels 27—27 suitably braced by diagonal angles 28 and cross channels 29, said structure being mounted on rollers 30—30 which run on I beams 31 secured to the roof members of the building or laboratory wherein the testing takes place. Adjustably secured to the depending channels 27 is a supporting frame or bed 32 recessed at its corners to fit the channels 27 and adapted to be secured in any adjusted position by set screws 33—33.

From the preceding description, it will be seen that the recording mechanism is entirely supported by a heavy frame from the roof of the building, and therefore the jars or vibrations resulting from the enormous blows delivered to the gear G which are finally transmitted to the ground or floor of the building, are not communicated to the recording device, and the latter is free from all vibration.

As in my said Patent No. 1,217,984, the recording mechanism consists, broadly, of two sets of devices, one for automatically recording in multiple the movement and action of the weight 12 and hence of the gear G, and the other, means for determining with the greatest precision the speed of rotation of the drums on which the records are made during the recording action. The means for recording the action of the gear will first be described.

Referring to Figs. 5 to 12 inclusive, 34 represents a base casting or plate which is secured on the supporting plate 32. Mounted on the base casting 34 is a small electric driving motor 35, the armature of which is provided with a worm that meshes with a worm gear 36 rigidly secured to the lower end of a hollow sleeve 37 that extends up through a bushing 38 secured to the under face of an upper plate 134. The upper plate 134 is rigid with respect to the lower plate 34 and the same are secured together and held in proper spaced relation by a plurality of posts 39. The sleeve 37 extends up through a suitable opening in the plate 134, and at its upper end is provided with a gear 40. Said gear, as clearly illustrated in Fig. 7, meshes with 4 other gears or pinions 41—41 that are secured to the lower ends of four corresponding rotatable drums 42. The drums and gears are carried by suitable shafts 43 rotatably supported in the plate 134.

From the preceding description, it will be seen that all the drums 42 are driven simultaneously and at the same speed from the motor 35. Furthermore, it will be noticed that the drums 42 are set at the four corners of a square, thus leaving a central space therebetween for the pencils or other form of stylus to mark on the record sheets 44—44 that are carried by each of the drums. The motor 35 is under the control of the operator by means of the electric switch 45, shown in Fig. 6.

In order to obtain four records, in duplicate, I have provided the following arrangement: Secured to the plate 134 and spaced the proper distance thereabove is a bridge plate 46 of more or less star-shape with the points extending between the cylinders, as clearly illustrated in Fig. 7. Secured at their bottom ends to the bridge plate 46 and extending vertically upward therefrom are four rods 47—47, equally spaced apart, said rods 47 having secured at their tops block 48, the outline of which is most clearly shown in Fig. 6. As there shown, the block 48 is provided with four radially extending arms 49, each arm being directed substantially toward the axis of a rotating drum. Rigidly connected to each of said radial arms 49 is a depending bar 50, (see Figs. 11 and 12). Pivotally connected to the lower end of the bar 50 is a short link 51, the latter, at its lower end having pivotally secured thereto another bar 52 that extends upwardly substantially to the corresponding radial arms 49. The bar 52, below its pivotal connection with the link 51 has rigidly secured thereto an extension 53. The lower end of the extension 53 passes through a radial slot 54 in the bridge plate 46 and below the bridge plate 46, each extension 53 is reduced in cross section so as to fit in a cam slot 55 in an oscillatable cam plate 56. The cam plate 56 has four of said cam slots 55, one for each of the cam rods just described, the slots 55 being spaced 90°, as clearly appears from Fig. 9. The cam plate 56 is provided on its under side with a hub 57 that rests upon the upper face of the gear 40, and in order to maintain the cam plate 56 in proper position and also limit it in its oscillating movements, two screws 58—58, diametrically disposed, are passed through circumferential slots 59 in the plate 56 and secured in the under face of the bridge plate 46. It will be understood that the screws 58 permit the easy movement of the cam plate 56 thereon and that said screws will limit the movements of the cam plate by engagement therewith at the ends of the slots 59.

The normal position of the cam bars 50, 51, 52 and 53 is as shown in full lines in Fig. 11, the lower ends thereof in said position being located as indicated by the cross-sections of said bars in Fig. 9.

In order to throw the cam bars inwardly and outwardly I employ the following mechanism: As shown in Fig. 7, a pull rod 60 is slidably mounted in the plate 134 and at its inner end said pull rod 60 is provided with a pin 61 that engages a slot in one arm of a bell-crank 62. The bell-crank 62 is extended upwardly through the bridge plate 46 and the other arm thereof extends over said bridge plate and has a depending pin 63 that passes through a slot 64 in said bridge plate. The pin 63 engages in a slot 65 in the cam plate 56, as illustrated in Fig. 9. By pulling the rod 60 by a knob at its outer end to the position indicated in dotted lines in Fig. 7, it is apparent that the bell-crank will be oscillated and will cause a corresponding oscillation of the cam plate 56. As the latter is so moved, the lower ends of all of the cam rods will travel outwardly in the cam slots 55, thereby moving the cam rods to the position indicated in dotted lines in Fig. 11. The function of this operation is for the purpose of controlling the pencils or markers, as about to be described. By a reverse movement of the rod 60, it is apparent that all the parts will be returned to normal, or as shown in full lines in the drawing, and during this operation, it is apparent that the extensions 53 of the cam rods are guided inwardly and outwardly by the slots 54 in the bridge plate 46.

The block 48 is centrally perforated, as indicated in Fig. 11 and slidably guided therein is a vertically extending rod 66 having a knob 67 at its upper end which is adapted to be engaged by an arm 168 secured to a bracket 169 carried by the drop hammer. The arm 168, as a matter of precaution is held in by wooden blocks 170 to prevent destruction of the recording mechanism should a gear not be in place when the drop hammer is released, it being understood that the arm 168 will strike an upstanding plate 171 secured to the member 32, and thus break the wooden blocks 170 in the manner described in my said application 38,111. The rod 66 extends downwardly through suitable perforations provided therefor in the bridge plate 46, cam plate 56, gear 40, plate 134, base casting 34, and supporting member 32. Rigidly secured to the rod 66 is a cross-head 172 having upstanding semi-circular sleeves 173 at the four corners thereof, which sleeves engage said four rods 47 and guide the cross-head in its up and down movements. Carried by the cross-head 172 are four pencils or other stylus arrangements, as most clearly indicated in Fig. 8, each pencil being adapted to coöperate with a cylinder, the outlines of the latter being diagrammatically indicated in said Fig. 8. Inasmuch as all of the pencil arrangements are alike, it will only be necessary to describe one of them.

By referring to Fig. 10, it will be seen that each pencil arrangement comprises an outstanding sleeve 174 rigid with the cross-head, in which sleeve 174 is slidably mounted a cylindrical tube 175. The latter is engaged at its rear end by a spring 176 seated in a suitable recess provided therefor in the cross-head. Rigidly attached to the tube 176 and extending outwardly therefrom through a slot 177 in the sleeve 174 is a pin 178 which engages and is controlled by the cam rod, heretofore described. When the cam rod is in the full line position shown in Fig. 11 it is apparent that the pin 178 and the tube 175 will always be held in retracted or inoperative position. When the cam rods are moved to the dotted line position shown in Fig. 11, it is apparent that the pencil tubes 175 will be projected outwardly under the influence of the springs 176. Carried in each of the tubes 175 is a split lead holder 179 which is secured in adjusted position with respect to the tube 175 by a set screw 180. The holder 179 carries a lead or other suitable marking device 181 that is also controlled by a light spring 182 mounted within said holder. By the foregoing arrangement, it is apparent that suitable adjustments may be made to compensate for wear of the lead and that the lead or other marking device will always be spring pressed against the record sheets on the cylinders. Surrounding the rod 66 is a spring 183 which engages the under side of the cross-head 172 at its upper end and is supported at its lower end by a bushing 184 on the base casting 34, (see Fig. 5). The spring 183 is preferably so designed as to compensate for the momentum of the crosshead 172 and rod 66 and its effect thereon, under recoil, properly calculated so as to prevent errors in the records during the recoil or release of the gear.

In order to obtain the base line on the record sheets, the drop hammer is lowered to a position just engaging the gear, which will cause the arm 168 to engage and depress the rod 66 to a certain point. During this operation, the cam rods are left in their normal position which will prevent the pencils from marking the records. When the drop hammer has been thus positioned with corresponding movements of the pencils, the cam rods are spread outwardly thus permitting the pencils to engage the record sheets and form the base line for the record thereon, it being understood that the cylinders carrying the record sheets are rotated at this time. The base line having thus been made, the cam rods are retracted, thus disengaging the pencils from the sheets, and the drop hammer elevated which in turn permits the cross-head carrying the pencils to resume the normal position shown in Fig. 11. When the record is to be made, after the base line has thus been obtained, the cam rods are again spread outwardly, which will permit the pencils to engage the record sheets during the fall of the drop hammer, thus producing a record similar to that illustrated in Fig. 18 of my said Patent No. 1,217,984, on each of the four cylinders.

The timing device which I employ with my improvements is the same, in essential features, as that described in my said Patent No. 1,217,984 and as shown, includes two upright, spaced, rigid guiding rods 69—70 carried in a U-shaped plate 71 secured to the bottom plate 34, the rods 69—70 being mounted on the inner faces of the arms of the U-shaped plate 71 and extending through recesses 72—72 cut in the plates 134 and member 32. The upper ends of the rods 69—70 are connected by cross-piece 73 which is secured thereto by rivets 74, (see Fig. 13). The rods 69—70 form guides for a heavy block or weight 75, shown in Figs. 13 and 15, and the cross section of which is indicated in Fig. 15. From the latter figure, it will be seen that there are only line contacts between the block 75 and the guiding rods 69 and 70, so that the amount of friction between the same when the block 75 falls, as hereinafter described, is practically negligible. At its upper end the block 75 is provided with a pin 76 under which is adapted to engage a shouldered hook 77 pivotally mounted as indicated at 78, the hook 77 constituting one arm of a bell-crank lever, the other arm of which is indicated at 79. To release the hook 77, I have provided a vertically slidable trip rod 80 which, at its lower end, is provided with a pin 81 that engages in a cam groove 82 formed in a block 83 carried by a rod 84, the latter being supported by the plate 134 and having a knob 85 at its outer end by which it is manipulated. The rod 84 is normally forced outward to the position shown in full lines in Fig. 7 by a spring 86, and when it is desired to release the weight, the rod 84 is pushed inwardly, thus elevating the pin 81 in the cam groove 82 and tripping the hook 77.

To cushion the weight 75, after it has performed its function, as hereinafter described, I provide a shock absorber comprising a portable standard 88, in which is telescopically mounted a spring controlled plunger 89, (see Fig. 2). The portable standard 88 is entirely separate from the remainder of the recording mechanism and is placed on the floor of the laboratory beneath the guide rods 69—70 to catch the falling weight, and in this way preventing any jar or vibration due to the stopping of the falling body from being transmitted to the recording mechanism.

Slidably mounted in a suitable perforation in the weight 75 is another pencil carrier 90, (see Figs. 13, 14 and 15). The pencil carrier 90 is provided with a pin 91 which engages a cam 92 formed on the vertical rod 70. The carrier 90 is normally retracted by a plate spring 93, which engages the pin 91, (see Fig. 15). The weight 75 is suitably recessed as indicated at 250 to accommodate and permit the retraction of the head of the pencil carrier and associated parts and in addition the opposite side of the weight may be recessed as indicated at 251 to provide a convenient finger hold in lifting the weight. The movements of the pencil carried by the weight 75 can be traced from Fig. 14, wherein two positions of the pin 91 are indicated in dotted lines therein. It will be understood that the timing device coöperates with one recording cylinder only as, in ordinary practice, this is all that is necessary. If the speed of rotation of one record is known, it is apparent that the speed of the other records will be the same, and thus the calculations can be obtained from any record.

The base lines for the records are made as hereinbefore described and need not be here repeated. After the base lines have been made and everything ready for taking the record, the operator releases the drop hammer by turning the switch 120 and simultaneously therewith releases the timing weight so as to obtain the surface speed of the record sheets while the records of the movements of the gear are being made thereon.

By referring to my said Patents No. 1,217,984 and No. 1,225,996, the method of calculating the work performed will be easily understood, and repetition thereof in this application is not believed necessary.

I have herein shown and described what I consider the preferred embodiment of the invention, but it will be understood that various changes and modifications may be made, particularly in the number of records produced, the method of controlling the movable pencils for making the records, etc., without departing from the spirit of the invention, and I contemplate all changes and modifications that come within the scope of the claims appended hereto.

I claim:

1. In mechanism of the character described, the combination with a relatively heavy member mounted so as to be capable of acceleration and to strike a heavy blow on a shock absorbing mechanism, of means for simultaneously recording in multiple the change of speed of said member while a blow is being delivered to the shock absorbing mechanism, said means including a plurality of rapidly moving recording surfaces, a stylus coöperable with each of said surfaces, and devices interposed between said member and said styli for actuating the latter over the record surfaces.

2. In a recording mechanism of the character described, the combination with a relatively heavy member mounted so as to be capable of acceleration and deceleration, of a recording device associated with said member including a plurality of rapidly moving recording surfaces, a stylus coöperable with each of said surfaces for relatively short intervals of time, and means, operated from said member while the latter is undergoing a change of speed, for actuating said styli into coöperative engagement with the respective recording surfaces to thereby make multiple records of the rate of speed change of said member during the short intervals of time.

3. In mechanism of the character described, the combination with a relatively heavy member mounted so as to be capable of acceleration and deceleration, of a recording device associated with said member, said device including a plurality of recording surfaces rapidly movable in lines transverse to the line of movement of said member, a stylus coöperable with each of said surfaces and movable in a line parallel to the movement of said member, and means, operated from said member while the latter is undergoing a change of speed, for actuating said styli simultaneously into operative engagement with said surfaces.

4. In a mechanism of the character described, the combination with a plurality of simultaneously and similarly automatically operated recording means each including a movable member for carrying a record strip, of a gravity controlled timing device associated with said means to indicate the speed of one of said movable members.

5. The combination with a drop hammer adapted to be brought to rest in its falling movement by a shock absorbing device, of a plurality of means for simultaneously and similarly recording the rate of deceleration of said hammer while being brought to rest by said device, said means including a slidably mounted block, said block carrying a marking device for each of said means, and a member carried by said drop hammer for actuating said block and moved in unison with the hammer during the deceleration of the latter.

6. In mechanism of the character described, the combination with a drop hammer adapted to be brought to rest in its fall by a shock absorbing device, a striking plate carried by and movable in unison with said hammer, of a plurality of movable record strips, a slidable cross-head positioned adjacent all of said strips, said cross-head carrying a plurality of marking elements corresponding in number to the number of said strips, each element being adapted to coöperate with one of said strips, said striking plate actuating said cross-head while the drop hammer is being acted upon by said shock absorbing device.

7. In a recording mechanism of the character described, the combination with a plurality of rotatable drums, of a reciprocating cross-head, a plurality of styli carried by said cross-head and adapted to coöperate with said drums in producing multiple records, and adjustable means for controlling said styli.

8. In a recording mechanism of the character described, the combination with a plurality of simultaneously rotatable recording drums, of a reciprocating cross-head movable between said drums, a plurality of marking elements carried by said cross-head and adapted to coöperate with said drums, a plurality of cam bars for controlling said elements, and a manually operable cam for positioning said bars.

9. In a recording mechanism of the character described, the combination with a plurality of drums rotatable about parallel axes, of a reciprocating cross-head adapted to move between said drums, a plurality of marking elements carried by said cross-head and adapted for coöperation with said drums, a plurality of pivoted cam bars for governing the action of said elements, an oscillatable cam plate with which said bars engage, and means for oscillating said plate to thereby adjust the position of said bars.

10. In a recording mechanism of the character described, the combination with a plurality of recording drums, means for driving said drums simultaneously and at the same speed, of a reciprocating cross-head adapted to move between said drums, a plurality of marking elements carried by said cross-head and arranged for coöperation with the drums, manually controlled means governing the operation of said marking elements, and a timing device coöperable with one of said drums.

11. In a recording mechanism of the character described, the combination with a plurality of rotatable drums, of a reciprocating cross-head, a plurality of marking elements carried by said cross-head and coöperable with said drums, a plurality of cam bars adapted to govern the position of said marking elements, a manually operable cam plate for controlling said cam bars, and a gravity controlled timing device, including a marking element, coöperable with one of said drums.

12. In a recording mechanism of the character described, the combination with a plurality of rotatable drums, means for producing identical records simultaneously on all of said drums, of a gravity controlled timing device, including a marking element, associated with one of said drums.

In witness that I claim the foregoing I have hereunto subscribed my name this 24th day of Jan. 1917.

JOHN F. O'CONNOR.

Witness:
JOSEPH HARRIS.